US006402878B1

(12) United States Patent
Bradford

(10) Patent No.: US 6,402,878 B1
(45) Date of Patent: Jun. 11, 2002

(54) PROCESS FOR MAKING A PICTURE FRAME

(76) Inventor: Richard N. Bradford, 578 North St., Longwood, FL (US) 32750

( * ) Notice: Subject to any disclaimer, the term of this patent is extended or adjusted under 35 U.S.C. 154(b) by 0 days.

(21) Appl. No.: 09/538,672

(22) Filed: Mar. 30, 2000

(51) Int. Cl.[7] .................................................. B32B 7/14

(52) U.S. Cl. .................... 156/272.8; 156/223; 156/248; 156/253; 156/277; 156/291; 40/771; 40/798

(58) Field of Search .......................... 156/63, 108, 223, 156/248, 253, 268, 272.8, 273.7, 275.3, 275.7, 275.5, 277, 291; 40/661, 594, 737, 767, 765, 771, 776, 777, 798

(56) References Cited

U.S. PATENT DOCUMENTS

| | | | | | |
|---|---|---|---|---|---|
| 224,973 A | * | 2/1880 | Wallis | ......................... | 40/737 |
| 2,942,368 A | * | 6/1960 | Gale | ........................... | 40/772 |
| 5,323,551 A | * | 6/1994 | Lovison et al. | ............... | 40/777 |
| 5,916,650 A | * | 6/1999 | Rosenbaum et al. | .......... | 40/737 |

FOREIGN PATENT DOCUMENTS

GB 2231551 A * 11/1990

* cited by examiner

*Primary Examiner*—Michael W. Ball
*Assistant Examiner*—John T. Haran
(74) *Attorney, Agent, or Firm*—William M. Hobby, III

(57) ABSTRACT

A process for making a picture frame includes the step of printing border art and registration marks on a piece of sheet material, such as paper, and marking a laser cut path on the printed sheet of material and then zone coating an adhesive onto the sheet material over the printed artwork. The process includes attaching the sheet material to a transparent polymer sheet, cutting the printed sheet material along the marked cut path to form a cutout in the printed sheet and removing the cutout portion of the printed sheet material which does not have adhesive applied thereto. The transparent polymer sheet is heated and folded to form a backing for the picture frame. The process can also utilize a zone coating of ultraviolet activated adhesive applied over the printed artwork, then passing the polymer sheet having the printed sheet attached thereto through a pair of rollers for removing air bubbles and directing ultraviolet light through the polymer sheet onto the adhesive to activate the adhesive. The process can also include attaching a frame easel or support to the back of the picture frame.

10 Claims, 2 Drawing Sheets

PROCESS FOR MAKING A PICTURE FRAME

BACKGROUND OF THE INVENTION

The present invention relates to a process of making a picture frame and especially to a process of making a clear polymer picture frame having a decorative border around a center window for mounting a photo or the like.

In the past, it has been common to make a wide variety of picture frames. A typical picture frame is formed having an edge molding having a rectangular shape with mitered corners and having a sheet of transparent glass or plastic, such as an acrylic sheet, mounted under an edge lip on the molding. A mat is positioned under the transparent sheet of glass having a cutout center portion for mounting artwork. Usually a non-porous backing and a stiff backing are positioned behind the artwork within the frame molding. The glass, mat, artwork, and backing can be held in place within the molding using small nails or the like to hold the framed artwork together. A hanger is typically added to the frame which may consist of screw eyes on two sides of the edge molding connected by a hanging wire.

The prior art also includes the use of picture frames made out of acrylic sheets which have had screen printed images on one side of the acrylic sheet. The image is printed to form a border having a transparent center portion where the print can be mounted. This becomes very labor intensive because printing each of the colors in the design requires that the acrylic sheet be passed through the press another time. Designs can also be screen printed onto an acrylic sheet. The screen printing does not produce the fine details in the print and to obtain finer detail requires much more expensive screen printing which still does not produce the fine details produced in off-set printing. This procedure can be utilized for printing solid borders onto an acrylic sheet having a transparent center portion for mounting a picture adjacent thereto for viewing from the other side of the sheet. Decorative frames can also be made using an acrylic sheet having border artwork offset printed onto a piece of paper which is then die cut to the shaped specifications. The die cut printed paper is slid into a clear acrylic frame. This tends to look cheap and unappealing to customers and, in addition, custom dies for custom shapes increases the cost of making the plastic picture frame. In any process, it is also desirable to mount a frame easel or hanger on the back of the acrylic picture frame in order to support the picture frame on a desk or to hang the picture frame on a wall or surface.

The present process is for making a laminated acrylic picture frame having a decorative and photo border which can be made in any desired shape. The high quality and fine print detail are laminated onto an acrylic frame without the use of expensive die charges and in a manner that small runs are economically feasible while also allowing fast and large production runs.

SUMMARY OF THE INVENTION

A process for making a picture frame includes the step of printing border art and registration marks on a piece of sheet material, such as paper, and marking a laser cut path on the printed sheet of material and then zone coating an adhesive onto the sheet material over the printed artwork. The process includes attaching the sheet material to a transparent polymer sheet, cutting the printed sheet material along the marked cut path to form a cutout in the printed sheet and removing the cutout portion of the printed sheet material which does not have adhesive applied thereto. The transparent polymer sheet is heated and folded to form a backing for the picture frame. The process can also utilize a zone coating of ultraviolet activated adhesive applied over the printed artwork, then passing the polymer sheet having the printed sheet attached thereto through a pair of rollers for removing air bubbles and directing ultraviolet light through the polymer sheet onto the adhesive to activate the adhesive. The process can also include attaching a frame easel or support to the back of the picture frame.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
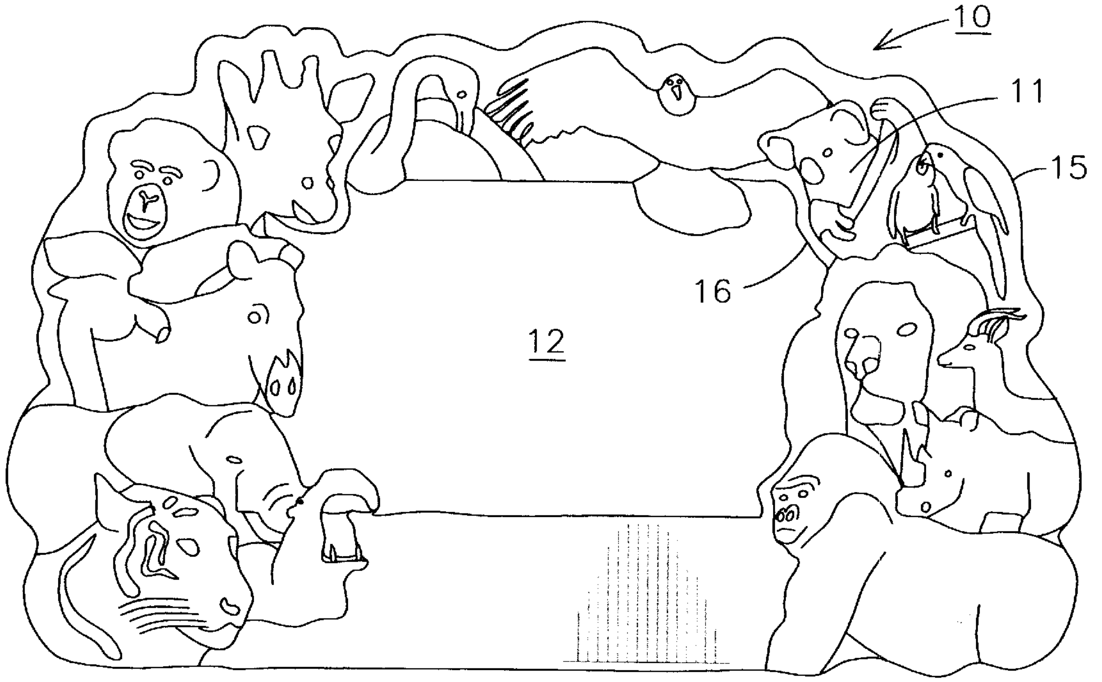
FIG. 1 is a front elevation of a laminated acrylic picture frame made in accordance with the present invention.
Figure 2:
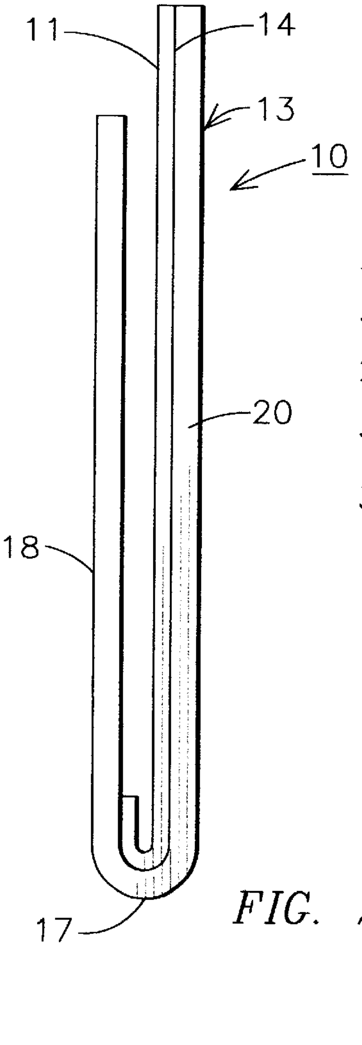
FIG. 2 is a side elevation of the picture frame of FIG. 1.

Referring to the drawings and especially to FIGS. 1 and 2, a laminated acrylic picture frame 10 is illustrated having a sheet of printed paper or the like 11 having an artwork border printed around an empty space 12. The printed artwork is adhesively laminated to an acrylic sheet 13 with an adhesive layer 14 which is positioned just around the border artwork 11. The border artwork 11 has an uneven edge 15 on the outside thereof and an uneven edge 16 on the inside adjacent the open picture holding area 12. The acrylic sheet 13 has been bent or folded at 17 to perform a back 18 for supporting a photograph between the back 18 and the front 20 of the laminated acrylic sheet 13 having the printed design 11 adhesively laminated to the rear of the front portion of the laminated acrylic picture frame 10.

Figure 4:
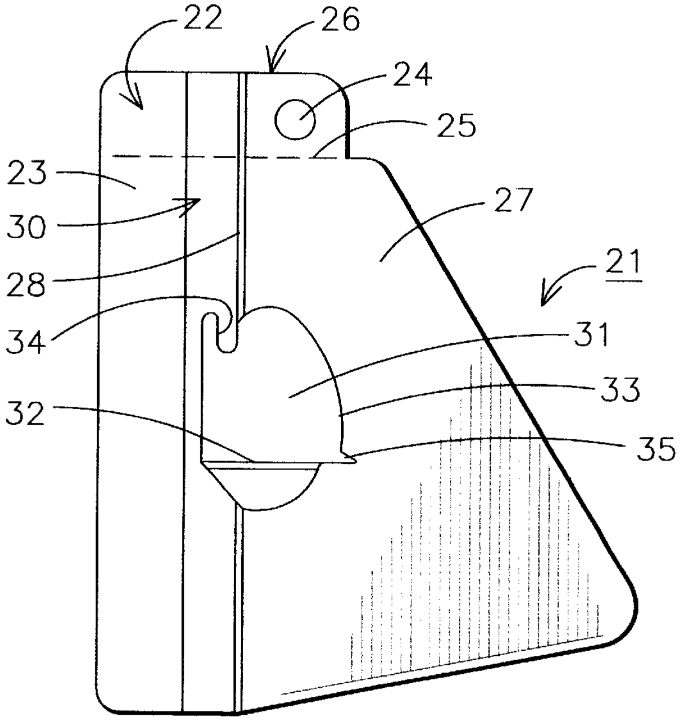
FIG. 4 is a side elevation of a folded easel for attaching to the picture frame of FIGS. 1 and 2.

Picture frame 10, in accordance with FIGS. 1 and 2, can have an easel 21 of FIG. 4 attached to the rear picture holding portion 18. The easel 21 has been die cut to a predetermined shape and has an adhesive coating over an edge 22 covered with an adhesive cover 23, such as a wax paper or the like, which is peeled off for attaching to a frame. The easel has an aperture 24 therethrough above a perforated line 25 such that the top portion 26 can be broken along the perforated edge 25 and the adhesive on that portion attached to the rear 18 of the frame 10 for attaching the frame to a wall. The remaining portion of the flat easel 21 can have the paper covering 23 removed and can be attached directly to the backside of the picture supporting back 18. The easel supporting leg 27 can be folded on the fold line 28 to rotate 90° to the fixed portion 30 of the easel support 21. The easel leg latch 31 can be folded on the fold line 32 to a 90° position so that when the easel support leg 27 is rotated along the curved surface 33, the latching notch 34 will slide into the latching notch 35 of the easel support leg 27 to hold the easel in an extended position approximately 90° from the back 18 of the frame 10.

Figure 3:
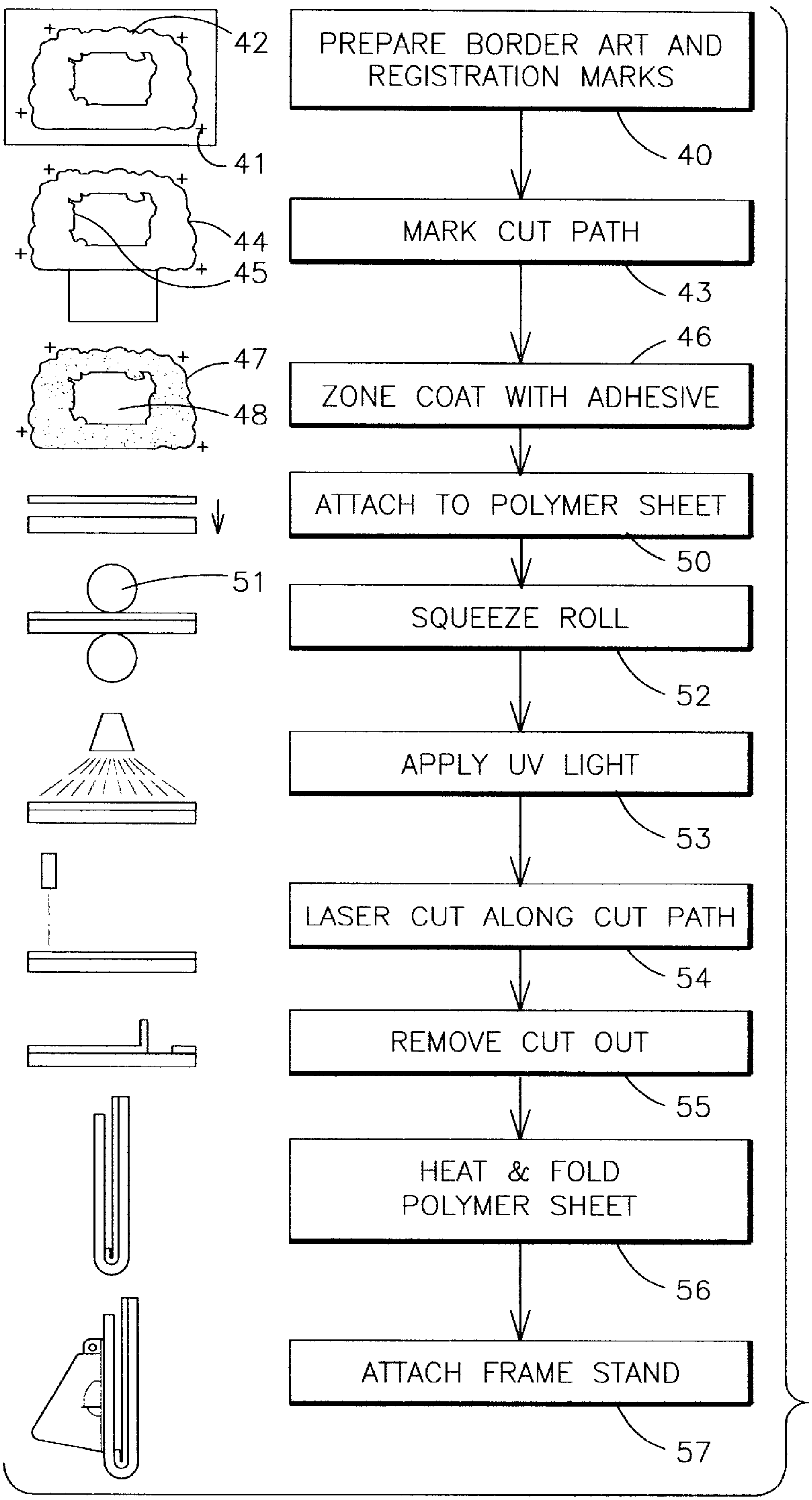
FIG. 3 is a flow diagram of the process of making a laminated acrylic picture frame in accordance with the present invention.

Turning to FIG. 3, the process of making the frame, as shown in FIGS. 1 and 2, is illustrated in which the border art is first prepared (40) complete with registration marks 41 on the artwork 42. Next, a digital cut path is created (43) for a C-N-C laser. The cut path follows the edges 44 and 45 for later cutting out the frame. The digital artwork is then offset printed onto the paper surface to form a photo design border for a picture frame which is then zone coated (46) with an adhesive 47 only on the front of the printed image without having the adhesive within the window portion 48. A clear ultraviolet curable adhesive is utilized and is applied to the zoned area directly on the printed image on the front of the paper. The adhesive can be applied by screen printing the adhesive on the offset paper over the printed area with a zone coating method to allow the window area to later be removed. A sheet of acrylic is precut to the appropriate size and is laid. on top of the offset printed paper which has been zone coated with an adhesive for attaching the offset printed paper to the acrylic polymer sheet (50). The acrylic sheet having the offset printed paper attached thereto is then fed between a pair of pressure rollers 51 to squeeze roll (52) the printed paper onto the acrylic sheet to thereby squeeze out air bubbles and to evenly adhere the paper to the acrylic. Both rollers are powered to prevent the paper and acrylic from being skewed during the lamination process and the top roller has dual air pressure adjustments for even pressure. Both rollers are rubber coated. The adhesive coated paper, which has now been laminated onto the acrylic and had the bubbles removed from the squeeze rollers, is passed under UV lamps (53) through the transparent side of the acrylic sheet to cure the adhesive. The sheet of paper with the printed image has the UV adhesive cured to give a laminated sheet on the acrylic sheet.

The laminated sheet is then positioned on a C-N-C driven laser table and registered with the cross hair lasers hung overhead so as to guide the laser around the marked lines 45 on the paper sheet laminated to the acrylic polymer sheet once the laminated paper offset printed registration marks 41 have been registered. The laser then cuts a path 54 along the computer driven cut path for the printed sheet. The power of the laser is adjusted so that you can cut out the window area 48 to enable the window paper to be removed while leaving a clear acrylic window in the middle of the laminated frame, such as the clear window area 12 of the frame of FIG. 1. When the frame area is cut out, the cut out center portion 48, which has not had any of the adhesive applied thereto, is removed from the frame. The cutout is removed in step 55. The polymer is then heated and folded (56) at the bend area 17 of FIG. 2 so that the one sheet of acrylic polymer forms both the frame and the backing for holding the picture within the frame. An easel stand is attached (57), such as the easel stand in FIG. 4, to the back 18 of the acrylic polymer sheet. The easel stand 21 of FIG. 4 is mounted flat to the back so that the entire frame can be shipped flat before the easel stand 21 is opened for supporting the frame on a flat surface.

It should be clear at this time that a process of making a laminated acrylic picture frame having a high quality printed border which may have a very irregular inside and outside shape to the border has been provided. It should, however, also be clear that the present invention is not to be limited to the forms shown which are to be considered illustrative rather than restrictive.

I claim:

1. A process for making a picture frame comprising the steps of:

printing border art work and registration marks on a piece of sheet material;

marking a cut path on said printed sheet material;

zone coating an adhesive onto said sheet material over said printed art work;

attaching said sheet material to a transparent polymer sheet;

cutting said printed sheet material along said marked cut path to form a cutout in said printed sheet; and removing a portion of said printed sheet material from said transparent polymer sheet to form a picture mounting window therein whereby a picture frame is made from a transparent polymer sheet having printed artwork mounted thereto and having a removed portion to form a picture holding window.

2. The process for making a picture frame in accordance with claim 1 including the step of heating an elongated area on said polymer sheet and folding said polymer sheet on said polymer sheet to form a picture holding back on said picture frame.

3. The process for making a picture frame in accordance with claim 2 in which the step of zone coating an adhesive includes zone coating a ultra-violet activated adhesive onto said sheet material over said printed artwork.

4. The process for making a picture frame in accordance with claim 3 including the step of passing said polymer sheet having said with printed sheet attached thereto through a pair of powered rollers for removing air bubbles from between said printed sheet and said polymer sheet.

5. The process for making a picture frame in accordance with claim 4 including the step of applying ultra-violet light through said polymer sheet onto said adhesive to activate said adhesive.

6. The process for making a picture frame in accordance with claim 1 including the step of aligning said registration marks on said printed sheet in a laser cutter and laser cutting along said cut marked path.

7. The process for making a picture frame in accordance with claim 2 including the step of attaching a frame easel to said picture holding back.

8. The process for making a picture frame in accordance with claim 6 in which the step of marking a cut-path includes marking an irregular cut-path.

9. The process for making a picture frame in accordance with claim 8 including the step of laser cutting an outer border of said polymer sheet.

10. The process for making a picture frame in accordance with claim 1 in which said polymer sheet is an acrylic polymer sheet.

* * * * *